United States Patent
Borcs et al.

(10) Patent No.: US 11,195,258 B2
(45) Date of Patent: Dec. 7, 2021

(54) DEVICE AND METHOD FOR AUTOMATIC IMAGE ENHANCEMENT IN VEHICLES

(71) Applicant: ROBERT BOSCH GMBH, Stuttgart (DE)

(72) Inventors: Attila Borcs, Budapest (HU); Kornel Istvan Kis, Tapolca (HU); Levente Kis, Budapest (HU); Peter Korosi-Szabo, Budapest (HU)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/575,686

(22) Filed: Sep. 19, 2019

(65) Prior Publication Data
US 2020/0098095 A1    Mar. 26, 2020

(30) Foreign Application Priority Data
Sep. 26, 2018  (DE) .......................... 102018216413.4

(51) Int. Cl.
*G06T 5/00*    (2006.01)
*G06T 7/80*    (2017.01)
(Continued)

(52) U.S. Cl.
CPC ................ *G06T 5/003* (2013.01); *G06T 5/20* (2013.01); *G06T 7/80* (2017.01); *G06T 11/001* (2013.01);
(Continued)

(58) Field of Classification Search
None
See application file for complete search history.

(56) References Cited

U.S. PATENT DOCUMENTS

| | | | | |
|---|---|---|---|---|
| 2007/0236601 A1* | 10/2007 | Hahn | .................... | G06T 3/4007 348/441 |
| 2008/0273752 A1* | 11/2008 | Zhu | ........................ | G08G 1/167 382/103 |

(Continued)

OTHER PUBLICATIONS

Xing, Yang, et al. "Advances in vision-based lane detection: algorithms, integration, assessment, and perspectives on ACP-based parallel vision." IEEE/CAA Journal of Automatica Sinica 5.3 (2018): 645-661. (Year: 2018).*

(Continued)

*Primary Examiner* — Andrae S Allison
(74) *Attorney, Agent, or Firm* — Norton Rose Fulbright US LLP; Gerard Messina

(57) ABSTRACT

A device and method for automatic image enhancement in vehicles, in particular land vehicles, including a camera to record a primary-image, and an image-processing-module to determine a resulting-image from the primary-image. The image-processing-module includes image-processing-filters, each configured to transform the primary-image in each case into an intermediate-image, an evaluation-module that outputs a quality-index for each of the intermediate-images transformed with the image-processing-filter, a selection-module that selects the intermediate-image having the highest quality index and outputs it as the resulting-image, and a learning-neural-network to learn, in a learning phase, for each primary-image the image-processing-filter, from the image-processing-filters, having the highest quality index of the intermediate-image, and after the learning phase, for each primary-image to select the image-processing-filter, from the image-processing-filters, having the highest quality index of the intermediate-image.

15 Claims, 7 Drawing Sheets

(51) Int. Cl.
*G06T 5/20* (2006.01)
*G06T 11/00* (2006.01)

(52) U.S. Cl.
CPC .............. *G06T 2207/20081* (2013.01); *G06T 2207/20084* (2013.01); *G06T 2207/30252* (2013.01)

(56) References Cited

U.S. PATENT DOCUMENTS

| | | | |
|---|---|---|---|
| 2009/0169052 A1* | 7/2009 | Seki | G06T 7/74 382/103 |
| 2010/0100268 A1* | 4/2010 | Zhang | G06K 9/00825 701/25 |
| 2013/0085642 A1* | 4/2013 | Dankers | G06K 9/605 701/48 |
| 2014/0086488 A1* | 3/2014 | Moteki | G06K 9/00483 382/182 |
| 2018/0225527 A1* | 8/2018 | He | G06K 9/00798 |

OTHER PUBLICATIONS

Chen, et al.: "Real-time Edge-Aware Image Processing with the Bilateral Grid", ACM Transactions on Graphics, 26(3), (2007), pp. 103-1-103-9.

\* cited by examiner

DEVICE AND METHOD FOR AUTOMATIC IMAGE ENHANCEMENT IN VEHICLES

RELATED APPLICATION INFORMATION

The present application claims priority to and the benefit of German patent application no. DE 10 2018 216 413.4, which was filed in Germany on Sep. 26, 2018, the disclosure of which is incorporated herein by reference.

FIELD OF THE INVENTION

The present invention relates to a device and a method for automatic image enhancement in vehicles, in particular land vehicles. The automatic image enhancement is used in vehicles, for example for assistance in a number of assistance systems, or is used in a vehicle that travels at least in a semi-automated manner.

BACKGROUND INFORMATION

In many cases, vehicle applications based on the sensor system of a camera rely on high quality of the camera image. The quality of the camera image may suddenly change in some scenarios, for example when traveling through a tunnel or during sudden changes in weather. In some camera-based systems, this may result in incorrect decisions in assistance systems, for example.

SUMMARY OF INVENTION

An object of the present invention is to enhance the quality of at least some camera images.

One aspect of the present invention relates to a method for automatic image enhancement in a vehicle, including the steps:
  recording a primary image with the aid of a camera;
  transforming the primary image into a plurality of intermediate images with the aid of a plurality of image processing filters;
  determining a quality index for each of the intermediate images transformed with the aid of the image processing filter;
  selecting, with the aid of a selection module, the intermediate image having the highest quality index and outputting it as the resulting image, in a learning phase, for each primary image a learning neural network learning the image processing filter, from the plurality of image processing filters, having the highest quality index of the intermediate image, and after the learning phase, for each primary image the learning neural network selecting from the plurality of image processing filters the image processing filter having the highest quality index of the intermediate image.

The vehicle for which the method is carried out includes a camera that records a primary image, and an image processing module that is configured to determine a resulting image from the primary image. The method or the resulting image may be utilized, for example, for controlling actuators of the vehicle.

A vehicle may be a land vehicle, in particular a passenger vehicle, a van, a truck, a land-based special purpose vehicle, an amphibious vehicle, a ship, or an aircraft. The camera may be a single camera, a stereo camera, or a plurality of cameras, for example in the form of a surround view camera. The camera may be configured to record single images or a sequence of images. The image that is recorded by the camera without further processing is referred to as a "primary image", sometimes also as a "raw image". The image that is output to a camera-based system after processing by the image processing module is referred to as a "resulting image". In many systems, the resulting image must meet certain quality requirements, for example with regard to brightness and/or contrast. Systems that use such resulting images as a basis include, for example, assistance systems, for example systems for lane recognition, recognition of stationary objects such as buildings or landmarks, or recognition of moving objects, for example other vehicles or pedestrians. These resulting images may be used, for example, by a vehicle that travels at least in a semi-automated manner.

The image processing module includes a plurality of image processing filters, each of which transforms the primary image in each case into an intermediate image in a further step. An image processing filter may carry out, for example, a color or contrast transformation, such as changing the gamma value, but may also carry out much more complex transformations. The transformations may be assisted by algorithms for image recognition. Different settings of a filter are considered as different image processing filters.

In a further step, with the aid of an evaluation module a quality index is output for each of the intermediate images transformed with the aid of the image processing filter. In some specific embodiments, the evaluation module may have a very simple configuration, for example, merely recognizing the average brightness of the image and/or a measure for the contrast. The evaluation module may also have a complex configuration; for example, it may compare the results of various image recognition algorithms and derive a quality index therefrom. The quality index is, for example, a scalar with the aid of which it is possible to rapidly compare the quality of the intermediate images. In particular, with the aid of the quality index it is possible to compare different types of images with different types of quality problems. Quality problems may include, for example, low contrast, white or color saturation, or distorted images. Each of the stated quality problems may require a particular filter for the image enhancement. An image may have more than one quality problem. The quality index may also be negative, in particular when none of the filters results in improvement, and instead results in degradation, of the primary image.

In a further step, with the aid of a selection module the intermediate image having the highest quality index is selected and is output as the resulting image. The resulting image may be the primary image under certain conditions, for example in the case when none of the filters results in enhancement of the primary image, or when the primary image already has good quality.

The image processing module also includes a learning neural network, which during a learning phase, for each primary image learns the image processing filter, from the plurality of image processing filters, having the highest quality index of the intermediate image, and after the learning phase, for each primary image selects, from the plurality of image processing filters, the image processing filter having the highest quality index of the intermediate image. The image processing module thus includes various operating modes or operating phases: during the learning phase, and after the learning phase. During the learning phase, the outputs of the neural network are not used, or the neural network does not output any values. The values include, for example, the type and parameters of the image processing filters. After the learning phase, the values that are output by the neural network are used to select the image processing filters. After the first learning phase, or after the neural network has developed a certain "basic knowledge," automatic image enhancement may thus take place via the image processing module. In one specific embodiment, the learning phase may be carried out, for example, on a server or on a processor in the vehicle. In one specific embodiment, the neural network may be operated on a processor in the vehicle.

In one specific embodiment, for unknown primary images the learning phase may be intermittently resumed; i.e., the neural network is still able to learn something new when it has already been used. The image processing module thus acquires an adaptive characteristic.

In one specific embodiment, a categorization of the type of images by the learning neural network takes place, for example for speeding up the output of the neural network.

In one specific embodiment, the learning neural network also uses a categorization module that determines an illumination category for each primary image. In one specific embodiment, the categorization module may determine further categories such as a distortion.

In one specific embodiment, at least one image processing filter from the plurality of image processing filters is configured to use a so-called bilateral grid as an image processing filter. The fundamentals of a bilateral grid are described, for example, in "Chen, J.; et al.: Real-time Edge-Aware Image Processing with the Bilateral Grid. MIT, 2007." In a bilateral grid, the x and y values represent pixel positions, and the z values are the intensity distance, for example the brightness in a black/white image. The advantage, among others, of using a bilateral grid is the "edge-aware brush" of the image. In addition, when a bilateral grid is used, different filter settings are regarded as different image processing filters.

In one specific embodiment, color parameters of the primary image are used separately from parameters of the bilateral grid, in particular parameters of a so-called guidance map. In the bilateral grid, each of the elements is a color transformation matrix (CTM) with representation as x-y-z coordinates. The x-y coordinates may have a reduced resolution compared to the primary image. In this case, the guidance map defines the correspondence between the pixels of the primary image and the CTM. The position of each pixel defines which CTM is to be used, and the value of the guidance map determines the associated z coordinate. In the case of gray scales, the z coordinate may be an indication of brightness values, for example. In the present invention, the z coordinates are not necessarily brightness values; in addition, the z coordinates may be learned. Therefore, the parameters of the guidance map represent the transformation of the colored primary image to the guidance map. This may be used to separate the color information of a primary image from the edge information. Thus, for example, the learning phase of the neural network may be more effectively configured.

In one specific embodiment, the plurality of image processing filters includes a filter for changing the brightness, a filter for changing the contrast, a filter for changing the color, a distortion filter, a sharpening filter, and/or a further filter. The further filters may be high pass filters or low pass filters, for example. A distortion filter may be used, for example, to compensate for converging lines or camera artifacts.

In one specific embodiment, the device also includes a categorization module that is configured to determine an illumination category for each primary image, the learning neural network being configured to learn, during the learning phase, for each primary image and/or for each illumination category, the image processing filter, from the plurality of image processing filters, having the highest quality index of the intermediate image, and after the learning phase, for each primary image and/or for each illumination category, to select the image processing filter, from the plurality of image processing filters, having the highest quality index of the intermediate image. The categorization module may result in an improvement and/or an acceleration of the image analysis by the neural network.

In one specific embodiment, the categorization module uses at least one of the following programs: an illumination rough estimate, a description of the weather data, a description of the actual surroundings, a piece of time information, or a further piece of information. This results in adaptation of at least one parameter of the image processing filter, which may be used for changing light conditions, for example. Changing light conditions occur, for example, when the vehicle enters a tunnel, or in the event of sudden overcast conditions or heavy rain.

An illumination rough estimate takes into account, for example, the predominant illumination conditions. The description of the weather data takes place, for example, from a network, for example from a predefined provider, or also from other, for example cooperating, vehicles. The description of the actual surroundings may take place via vehicle-internal maps, GPS systems, or a GPS system that is enhanced with current traffic data. The piece of time information may contain a point in time and a date, and may supply, for example, an initial indicator for day or night. The further information may include, for example, astronomical data such as the time of sunset.

In one specific embodiment, the camera is configured to record a sequence of primary images. This may be used, for example, to draw additional conclusions from the past, i.e., preceding primary images. Thus, for example, based on a rapid change in the light conditions compared to preceding primary images, the conclusion "traveling through a tunnel" may be drawn; for slow changes, for example the conclusion "twilight" may be drawn.

In one specific embodiment, when a predefined quality criterion is met, the resulting image is the same as the primary image. The quality criterion may be met, for example, when the quality of the primary image is high enough, for example when the brightness, contrast, or sharpness of the primary image is sufficient, and/or the distortion of the primary image is low. The quality criterion may also be met when none of the image processing filters achieves a higher quality for any intermediate image.

One aspect of the present invention relates to a device for image enhancement for a vehicle. The device includes a camera that is configured to record a primary image, and an image processing module that is configured to determine a resulting image from the primary image. The image processing module includes a plurality of image processing filters, each of which is configured to transform the primary image in each case into an intermediate image. In addition, the device includes an evaluation module that outputs a quality index for each of the intermediate images transformed with the aid of the image processing filter, and a selection module that selects the intermediate image having the highest quality index and outputs it as the resulting image. Furthermore, the device includes a learning neural network that is configured to learn, in a learning phase, for each primary image the image processing filter, from the plurality of image processing filters, having the highest quality index of the intermediate image, and after the learning phase, for each primary image to select the image processing filter, from the plurality of image processing filters, having the highest quality index of the intermediate image.

A further aspect of the present invention relates to an image processing module that is configured to determine a resulting image for a vehicle from the primary image. The image processing module includes a plurality of image processing filters, each of which is configured to transform the primary image in each case into an intermediate image. An image processing filter may carry out, for example, a color or contrast transformation, such as changing the gamma value, but may also carry out much more complex transformations. The image processing module also includes an evaluation module that outputs a quality index for each of the intermediate images transformed with the aid of the image processing filter. The quality index is, for example, a scalar with the aid of which it is possible to rapidly compare the quality of the intermediate images. The image processing module also includes a selection module that is configured to select the intermediate image having the highest quality index and output it as the resulting image.

The image processing module also includes a learning neural network that is configured to learn, during a learning phase, for each primary image the image processing filter, from the plurality of image processing filters, having the highest quality index of the intermediate image, and after the learning phase, for each primary image to select the image processing filter, from the plurality of image processing filters, having the highest quality index of the intermediate image. During the learning phase, the outputs of the neural network are not used, or the neural network does not output any values. The values include, for example, the type and parameters of the image processing filters. After the learning phase, the values that are output by the neural network are used to select the image processing filters.

A further aspect of the present invention relates to the use of a device or a method for automatic image enhancement in a vehicle as described above.

A further aspect of the present invention relates to a program element which, when executed on a processor unit, is configured to carry out the stated method. The processor unit may include specialized hardware for graphics acceleration, a so-called graphics card, and/or specialized hardware having the functionality of a neural network, for example a neural network processing (NNP) unit.

A further aspect of the present invention relates to a computer-readable medium on which the stated program element is stored.

Further measures that enhance the present invention are explained in greater detail below, together with the description of the exemplary embodiments of the present invention, based on the figures.

DETAILED DESCRIPTION

Figure 1:
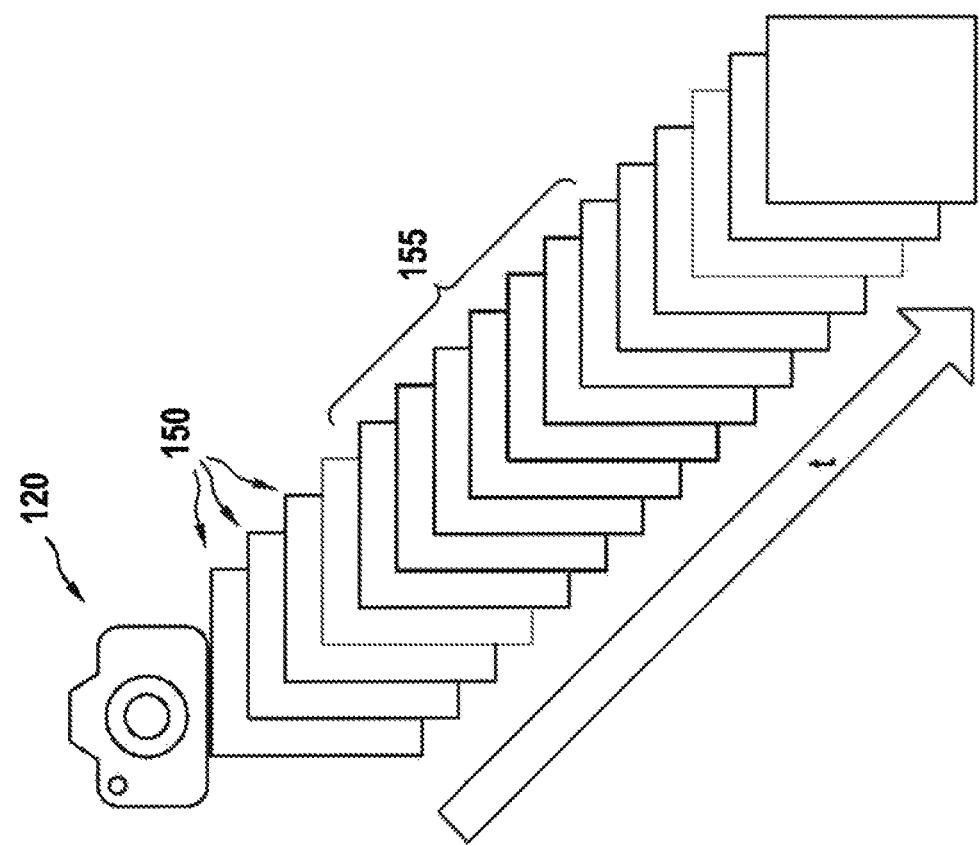
FIG. 1 schematically shows a sequence by way of example of images that have been recorded by a camera according to one aspect of the present invention.

According to FIG. 1, a camera 120, which is situated on a vehicle, for example, records a sequence by way of example of primary images 150 according to one aspect of the present invention. This sequence of primary images 150 is illustrated over a timeline t. A portion of the primary images 150 denoted by reference numeral 155 has quality problems, so that this portion of primary images 150 is not usable, or is not usable without further processing, for example for assistance systems of the vehicle. These primary images 155 may be relayed to a device 100 for image enhancement, in particular automatic image enhancement, so that after the image enhancement, at least a portion of these images is usable as resulting image 190 for the assistance systems. Remaining primary images 150, depending on the specific embodiment, may be relayed directly to the assistance systems or also treated with certain filters.

Figure 2:
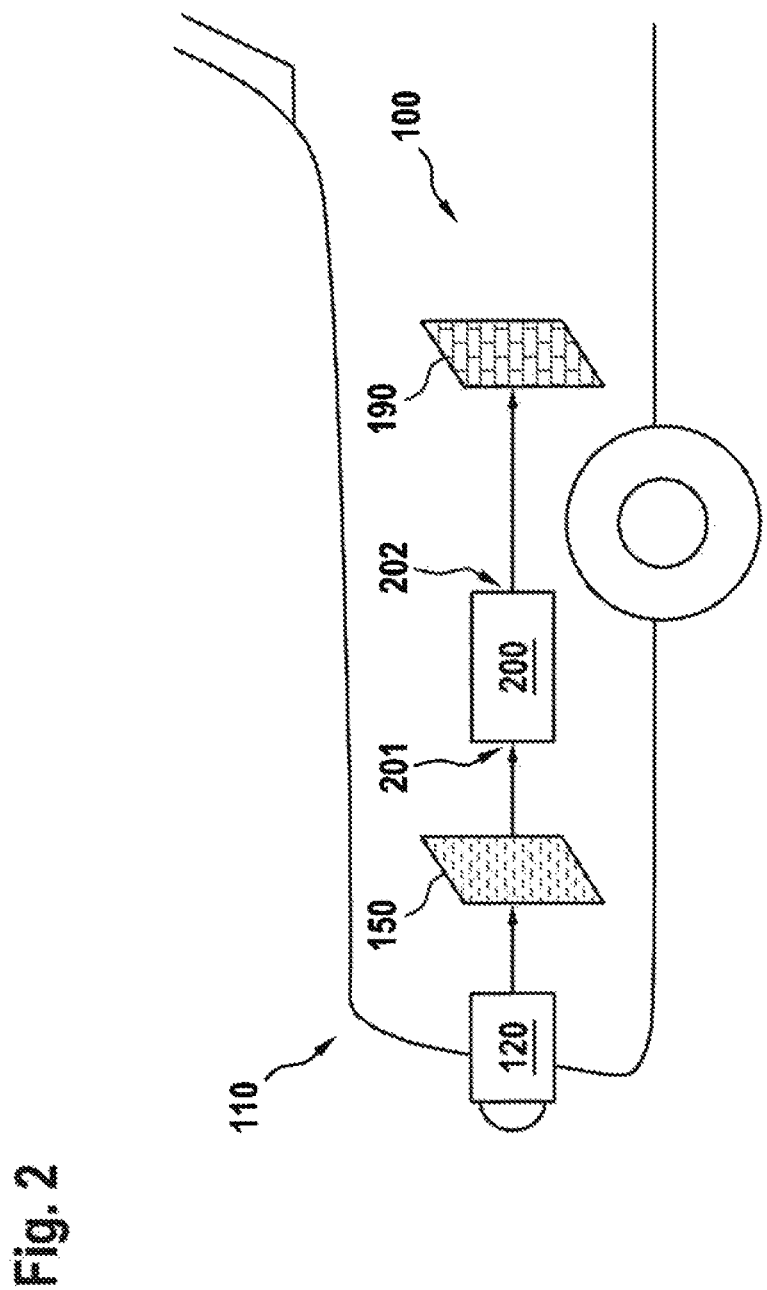
FIG. 2 schematically shows a vehicle that includes one specific embodiment of the device described above.

FIG. 2 schematically shows a vehicle 110 that includes one specific embodiment of above-described device 100. Device 100 includes a camera 120 that is situated, for example, in the front area of vehicle 110. Device 100 may also include multiple cameras 120. Camera or cameras 120 may also be situated at other locations on vehicle 110, for example in the side mirrors. Each of cameras 120 records a primary image 150 or a sequence of primary images 150. Primary image 150 is transmitted to input 201 of an image processing module 200. After the processing in image processing module 200, a resulting image 190 is available at output 202 of image processing module 200 and may be used by an assistance system, for example (not shown here). Image processing module 200 may be part of a processor unit (not shown here). The processor unit may include specialized hardware for graphics acceleration, a so-called graphics card, and/or specialized hardware having the functionality of a neural network, for example a neural network processing (NNP) unit.

Figure 3:
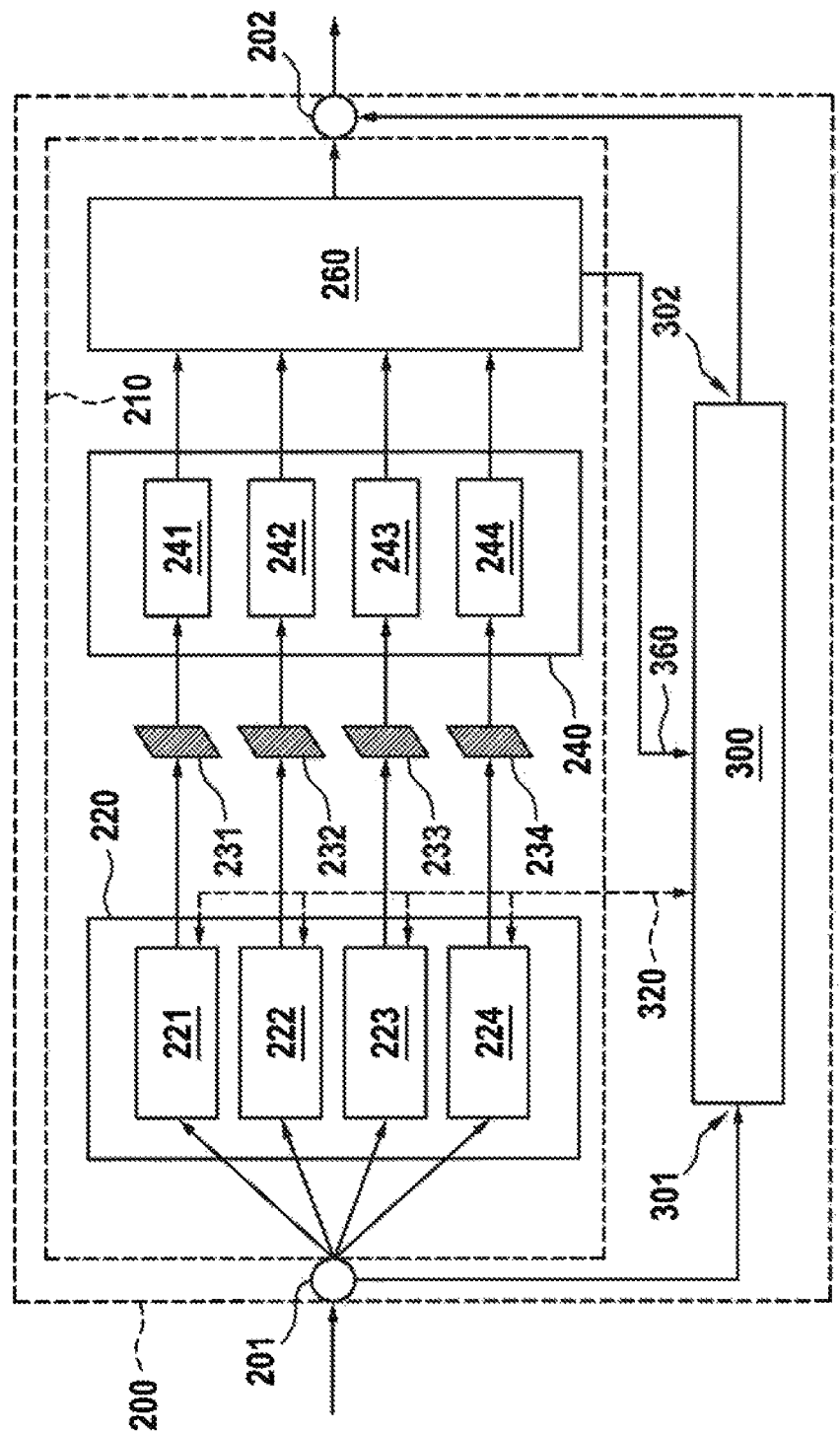
FIG. 3 schematically shows one specific embodiment of an image processing module according to one aspect of the present invention.

FIG. 3 schematically shows one specific embodiment of an image processing module 200 according to the present invention. For example, primary image 150 is transmitted from a camera 120 to input 201 of image processing module 200. Primary image 150 is transmitted from an input 201 to a filter bank 220 that includes a plurality of image processing filters 221, 222, 223, 224. These image processing filters may include, for example, a so-called bilateral grid, a filter for changing the brightness, a filter for changing the contrast, a filter for changing the color, a distortion filter, a sharpening filter, and/or a further filter. Further filters may be high pass filters or low pass filters, for example. A distortion filter may be used, for example, to compensate for converging lines or camera artifacts. Some of these various filters may also be of the same filter type, but using different parameters in each case. Each of the plurality of image processing filters 221, 222, 223, 224 is configured to transform the primary image 150 in each case into an intermediate image 231, 232, 233, 234. Each of intermediate images 231, 232, 233, 234 is evaluated by an evaluation module 240, which outputs a quality index for each of intermediate images 231, 232, 233, 234 transformed with the aid of particular image processing filter 221, 222, 223, 224. As shown, evaluation module 240 is made up, for example, of submodules 241, 242, 243, 244, at each of the outputs of which a quality index is available and is transmitted to a selection module 260. The quality index may be a scalar, and may be greater than zero ("improved"), equal to zero ("no improvement in quality"), or less than zero ("poorer"). One of the image processing filters, for example 224, may also be a "direct filter"; i.e., primary image 150 is transmitted to an intermediate image 234 without change and is evaluated with a quality index (zero, for example). Selection module 260 uses the intermediate image having the highest quality index, and outputs the selected intermediate image via an output 202 of image processing module 200. This intermediate image is then available to subordinate modules as resulting image 190.

Primary image 150 is also transmitted to an input 301 of a neural network 300. During a learning phase, neural network 300 learns from primary image 150, image processing filter 221, 222, 223, 224 that is used (via an interface 320), and selection module 260 (via an interface 360), which image processing filter is most suitable for which primary image. After the learning phase, neural network 300 selects the optimal image processing filter for this primary image 150 (via interface 320), and outputs resulting image 190 directly via an output 302 of neural network 300 to output 202 of image processing module 200. After the learning phase, the total computing power of image processing module 200 is thus needed only when primary image 150 for neural network 300 is unknown; i.e., in most cases, only the selected image processing filter is connected. The learning phase is thus much more computationally intensive than the time after the learning phase. In some specific embodiments, the learning phase therefore takes place on a server, and the "trained" neural network 300 is then transferred to the processor unit of the vehicle.

Figure 4:
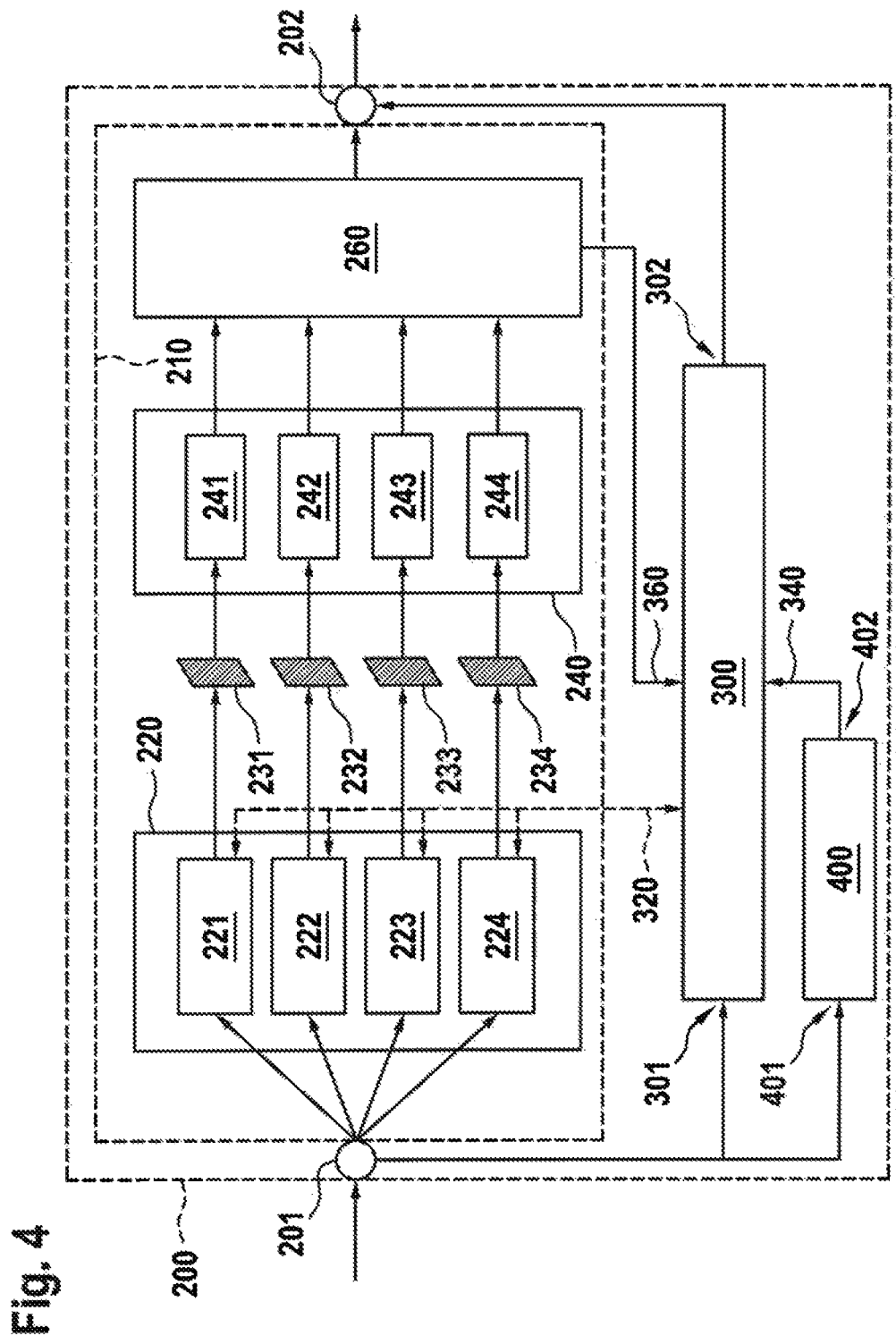
FIG. 4 schematically shows another specific embodiment of an image processing module according to a further aspect of the present invention.

FIG. 4 shows another specific embodiment of an image processing module 200 according to a further aspect of the present invention. Most of the components and functionalities are identical to FIG. 3. However, this specific embodiment additionally includes a categorization module 400. Primary image 150 is transmitted to an input 401 of categorization module 400. Categorization of primary image 150 takes place in categorization module 400. An illumination category may be determined for each primary image 150. In further specific embodiments, categorization module 400 may also carry out further categorizations, for example determining an image distortion.

Categorization module 400 uses at least one of the following programs: an illumination rough estimate, a description of the weather data, a description of the actual surroundings, a piece of time information, or a further piece of information. After this processing, an illumination category, for example, is available at an output 402 of categorization module 400. This illumination category is provided to neural network 300 (via an interface 340). Neural network 300 may use the illumination category in addition to or instead of primary image 150. Categorization module 400 may therefore result in an improvement and/or an acceleration of the image analysis by neural network 300.

Figure 5:
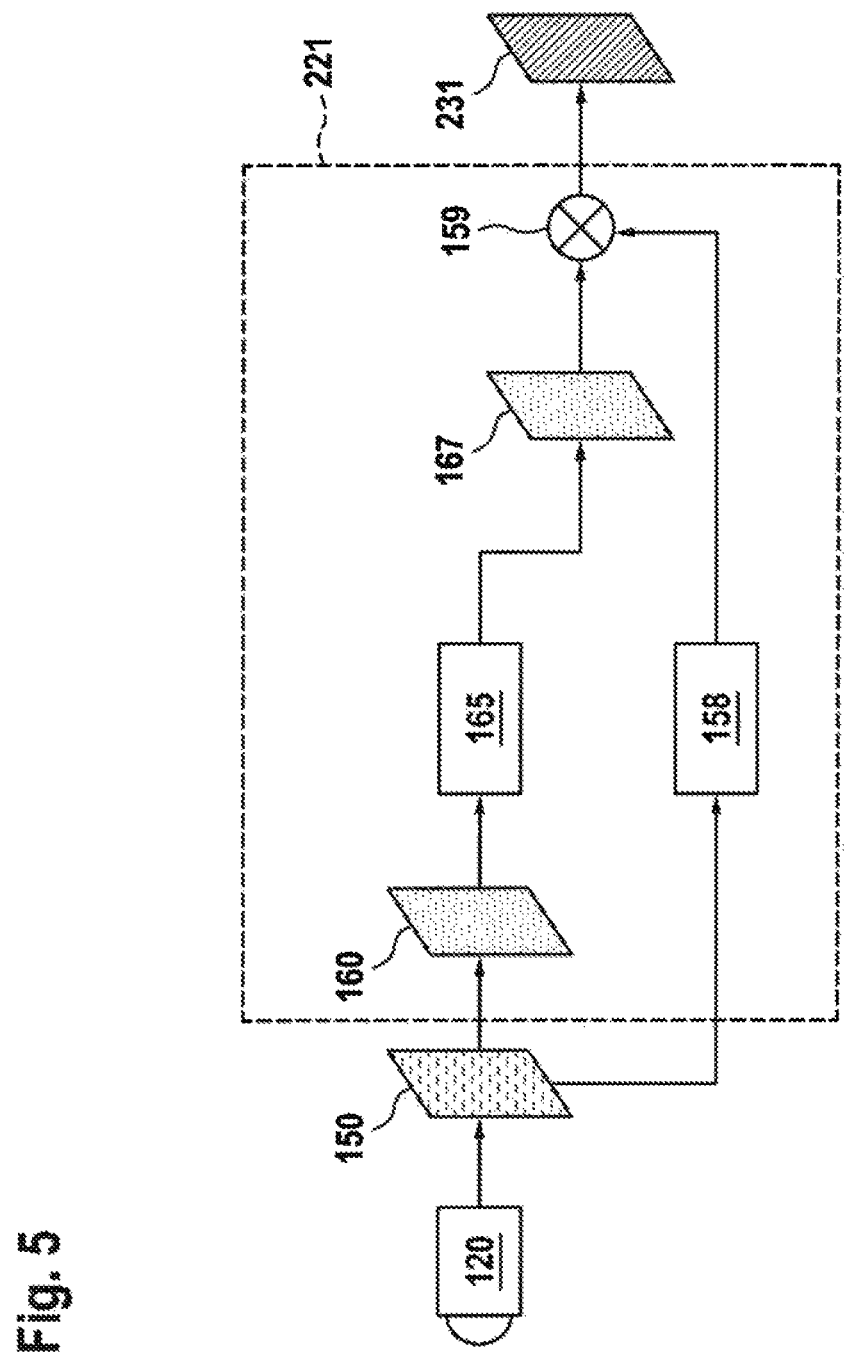
FIG. 5 schematically shows an example of an image processing filter according to a further aspect of the present invention.

FIG. 5 shows an example of an image processing filter 221 according to one aspect of the present invention; this image processing filter 221 uses a so-called bilateral grid. For this purpose, in the upper line of FIG. 5 a reduced-information image 160 (a black/white image, for example) is used. This is illustrated as a bilateral grid 167 with the aid of transformation 165. Using bilateral grids has the advantage, among others, of an edge-aware grading of the image. Color parameters 158 of primary image 150 are transmitted in the lower line of FIG. 5. Bilateral grid 167 is combined with color parameters 158 in unit 159, resulting in an intermediate image 231 which in certain cases has a higher quality for subordinate programs. This separation of the color information of primary image 150 from the edge information may be used to more effectively configure the learning phase of the neural network.

Figure 6:
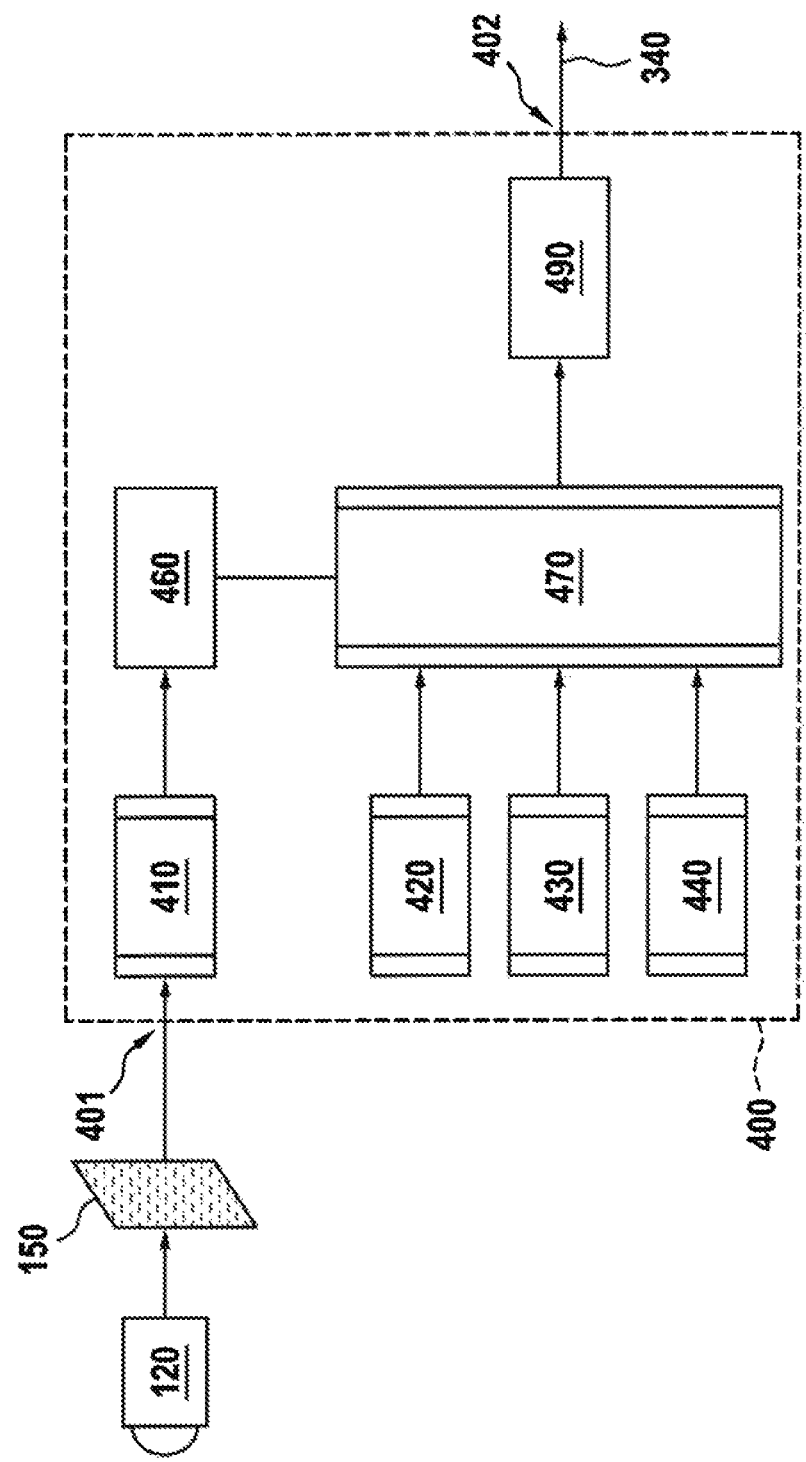
FIG. 6 schematically shows an example of a categorization module according to a further aspect of the present invention.

FIG. 6 shows an example of a categorization module 400 according to a further aspect of the present invention. Primary image 150 is transmitted from camera 120 to an input 401 of categorization module 400. An illumination rough estimate 460 subsequently takes place with the aid of an estimation module 410. Depending on the specific embodiment, the illumination rough estimate may then be relayed as a categorization result 490 from combination module 470 to an output 402, and (via interface 340) to neural network 300 (see FIG. 4). In some specific embodiments, in addition to illumination rough estimate 410, combination module 470 also uses, for example, a description of weather data 420, a description of actual surroundings 430, a piece of time information 440, or a further piece of information.

Figure 7:
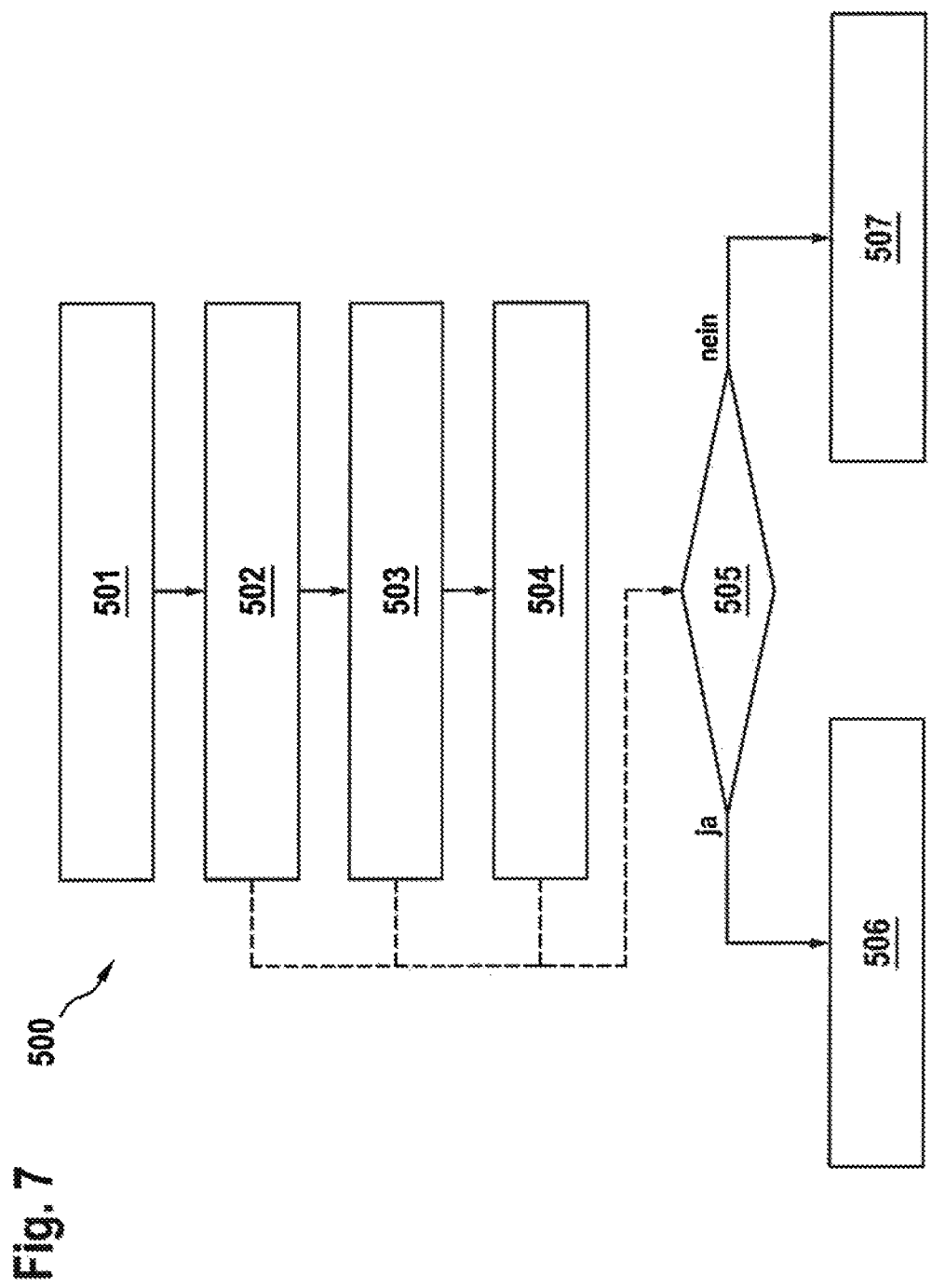
FIG. 7 schematically shows one exemplary embodiment according to one aspect of the present invention for image enhancement in a vehicle.

FIG. 7 shows a method 500 according to one aspect of the present invention for image enhancement in a vehicle 110. The recording of primary image 150 with the aid of a camera 120 takes place in a step 501. Primary image 150 is transformed into a plurality of intermediate images 231, 232, 233, 234 with the aid of a plurality of image processing filters 221, 222, 223, 224 in a step 502. A quality index is determined for each of intermediate images 231, 232, 233, 234 in a step 503. Lastly, the intermediate image having the highest quality index is selected with the aid of a selection module 260 and is output as resulting image 190 in a step 504. Steps 502 through 504 depend on whether a neural network 300 is operated during or after a learning phase. During the learning phase, neural network 300 learns from primary image 150, image processing filter 221, 222, 223, 224 that is used (via an interface 320), and selection module 260 (via an interface 360), which image processing filter is most suitable for which primary image. After the learning phase, neural network 300 selects the optimal image processing filter for this primary image 150 (via interface 320), and outputs resulting image 190, for example directly via an output 302 of neural network 300, to output 202 of image processing module 200.

What is claimed is:

1. A method for providing automatic image enhancement in a vehicle, the method comprising:
   recording a plurality of primary images with a camera;
   for each of the plurality of primary images:
   a processor transforming the respective primary image with a plurality of image processing filters that each produces a respective one of a plurality of intermediate images from the respective primary image;
   determining, with the processor, a quality index for each of the plurality of intermediate images that have been produced for the respective primary image; and
   the processor selecting, as a resulting image, whichever one of the plurality of intermediate images that has a highest of the quality indexes that have been determined for the plurality of intermediate images that have been produced for the respective primary image;

the processor executing a learning phase of a learning neural network in which the learning neural network learns, for each respective one of the plurality of primary images, an assignment of a respective one of the plurality of image processing filters to the respective primary image, the respective one of the plurality of image processing filters that is assigned being whichever one of the plurality of image processing filters for which the processor had determined the highest of the quality indexes for the plurality of intermediate images that have been produced for the respective primary image; and after the learning phase, when any of the plurality of primary images is recorded again, the processor determining which of the plurality of primary images has been recorded again, and, based on the assignments of the learning phase, transforming, by the processor using the learning neural network, the primary image that has been recorded again using the respective one of the plurality of image processing filters that had been assigned to the primary image that has been recorded again without performing transformations using others of the plurality of image processing filters that have not been assigned to the primary image that has been recorded again.

2. The method of claim 1, wherein the computer program, when executed by the processor, causes the processor to determine a respective illumination category for each recorded primary image for the learning neural network to thereby determine whether a newly recorded primary image is one of the plurality of primary images to which a respective one of the image processing filters had previously been assigned.

3. The method of claim 1, wherein at least one image processing filter from the plurality of image processing filters is configured to use a bilateral grid.

4. The method of claim 1, wherein color parameters of the primary images are used separately from parameters of the bilateral grid.

5. The method of claim 1, wherein the plurality of image processing filters includes a filter for changing the brightness, a filter for changing the contrast, a filter for changing the color, a distortion filter, and/or a sharpening filter.

6. The method of claim 1, further comprising:
determining, by the processor, an illumination category for each primary image;
wherein during the learning phase, the learning neural network learns the assignments respective for each of the illumination categories; and
wherein after the learning phase, for each newly recorded primary image, the image processing filter that is assigned to a same illumination category into which the newly recorded primary image is categorized is selected for transforming the newly recorded primary image.

7. The method of claim 6, wherein the categorization is performed using at least one of the following: an illumination rough estimate, a description of the weather data, a description of the actual surroundings, and a piece of time information.

8. The method of claim 1, wherein when a predefined quality criterion is met, the resulting image is the same as the primary image.

9. The method of claim 1, further comprising:
after the learning phase, for a newly recorded primary image, the processor:
determining whether the newly recorded primary image is one of the plurality of primary images to which respective ones of the plurality of image processing filters have been assigned in the learning phase; and
responsive to the newly recorded primary image being determined not to be any of the plurality of primary images to which respective ones of the plurality of image processing filters have been assigned in the learning phase, re-performing the learning phase for the newly recorded primary image to assign one of the plurality of image processing filters to the newly recorded primary image by transforming the newly recorded primary image into a plurality of intermediate images using each of the plurality of image processing filters, determining a respective quality index for each of the plurality of intermediate images produced from the newly recorded primary image, and selecting, for assignment to the newly recorded primary image, whichever one of the plurality of image processing filters for which the processor had determined the highest of the quality indexes for the plurality of intermediate images that have been produced for the newly recorded primary image.

10. The method of claim 1, further comprising:
the processor categorizing each of the plurality of primary images, wherein, for each respective one of the plurality of primary images, the respective primary image is considered by the processor to be recorded again when a respective newly recorded primary image is categorized as belonging to a same category as the respective one of the plurality of primary images.

11. An image processing module comprising:
a plurality of image processing filters that, each is configured to, for each of a plurality of primary images recorded with a camera, transform the respective primary image into a respective one of a plurality of intermediate images;
an evaluation module that is configured to, for each of the plurality of primary images, output a respective quality index for each of the plurality of intermediate images into which the respective primary image has been transformed with the plurality of image processing filters;
a selection module configured to, for each of the plurality of primary images, select, as a resulting image, whichever one of the plurality of intermediate images that has a highest of the quality indexes that have been output for the plurality of intermediate images into which the respective primary image has been transformed; and
a learning neural network configured to:
in a learning phase, for each respective one of the plurality of primary images learn an assignment of a respective one of the plurality of image processing filters to the respective primary image, the respective one of the plurality of image processing filters that is assigned being whichever one of the plurality of image processing filters for which the processor the highest of the quality indexes had been determined; and
after the learning phase, when any of the plurality of primary images is recorded again, determine which of the plurality of primary images has been recorded again, and, based on the assignments of the learning phase, transform the primary image that has been recorded again using the respective one of the plurality of image processing filters that had been assigned to the primary image that has been recorded again without performing transformations using others of the plurality of image processing filters that have not been assigned to the primary image that has been recorded again.

12. A device for providing image enhancement for a vehicle, the device comprising:
a camera; and
a processor, wherein the processor is configured to:
for each of a plurality of primary images recorded with the camera:
transform the respective primary image with a plurality of image processing filters that each produces a respective one of a plurality of intermediate images from the respective primary image;
determine a quality index for each of the plurality of intermediate images that have been produced for the respective primary image; and
select, as a resulting image, whichever one of the plurality of intermediate images that has a highest of the quality indexes that have been determined for the plurality of intermediate images that have been produced for the respective primary image;
execute a learning phase of a learning neural network in which the learning neural network learns, for each respective one of the plurality of primary images, an assignment of a respective one of the plurality of image processing filters to the respective primary image, the respective one of the plurality of image processing filters that is assigned being whichever one of the plurality of image processing filters for which the processor had determined the highest of the quality indexes for the plurality of intermediate images that have been produced for the respective primary image; and
after the learning phase, when any of the plurality of primary images is recorded again:
determine which of the plurality of primary images has been recorded again; and
based on the assignments of the learning phase, use the learning neural network to transform the primary image that has been recorded again using the respective one of the plurality of image processing filters that had been assigned to the primary image that has been recorded again without performing transformations using others of the plurality of image processing filters that have not been assigned to the primary image that has been recorded again.

13. An apparatus for providing automatic image enhancement in a vehicle, the apparatus comprising a device configured to perform the following:
for each of a plurality of primary images recorded with a camera:
transform the respective primary image with a plurality of image processing filters that each produces a respective one of a plurality of intermediate images from the respective primary image;
determine a quality index for each of the plurality of intermediate images that have been produced for the respective primary image; and
select, as a resulting image, whichever one of the plurality of intermediate images that has a highest of the quality indexes that have been determined for the plurality of intermediate images that have been produced for the respective primary image;
execute a learning phase of a learning neural network in which the learning neural network learns, for each respective one of the plurality of primary images, an assignment of a respective one of the plurality of image processing filters to the respective primary image, the respective one of the plurality of image processing filters that is assigned being whichever one of the plurality of image processing filters for which the device had determined the highest of the quality indexes for the plurality of intermediate images that have been produced for the respective primary image; and
after the learning phase, when any of the plurality of primary images is recorded again:
determine which of the plurality of primary images has been recorded again; and
based on the assignments of the learning phase, use the learning neural network to transform the primary image that has been recorded again using the respective one of the plurality of image processing filters that had been assigned to the primary image that has been recorded again without performing transformations using others of the plurality of image processing filters that have not been assigned to the primary image that has been recorded again.

14. A non-transitory computer-readable medium on which is stored a computer program that is executable by a processor and that, when executed by the processor, causes the processor to perform a method for providing automatic image enhancement in a vehicle, the method comprising:
for each of a plurality of primary images recorded with a camera:
transforming the respective primary image with a plurality of image processing filters that each produces a respective one of a plurality of intermediate images from the respective primary image;
determining a quality index for each of the plurality of intermediate images that have been produced for the respective primary image; and
selecting, as a resulting image, whichever one of the plurality of intermediate images that has a highest of the quality indexes that have been determined for the plurality of intermediate images that have been produced for the respective primary image;
executing a learning phase of a learning neural network in which the learning neural network learns, for each respective one of the plurality of primary images, an assignment of a respective one of the plurality of image processing filters to the respective primary image, the respective one of the plurality of image processing filters that is assigned being whichever one of the plurality of image processing filters for which the processor had determined the highest of the quality indexes for the plurality of intermediate images that have been produced for the respective primary image; and
after the learning phase, when any of the plurality of primary images is recorded again, determining which of the plurality of primary images has been recorded again, and, based on the assignments of the learning phase, transforming, using the learning neural network, the primary image that has been recorded again using the respective one of the plurality of image processing filters that had been assigned to the primary image that has been recorded again without performing transformations using others of the plurality of image processing filters that have not been assigned to the primary image that has been recorded again.

15. The computer-readable medium of claim 14, wherein the computer program, when executed by the processor, causes the processor to determine a respective illumination category for each recorded primary image for the learning neural network to thereby determine whether a newly recorded primary image is one of the plurality of primary images to which a respective one of the image processing filters had previously been assigned.

* * * * *